FIG. 1A

INVENTOR.
MARION ARENDARSKI

FIG. IB

INVENTOR.
MARION ARENDARSKI

FIG. 2B

INVENTOR.
MARION ARENDARSKI

FIG. 2A

INVENTOR.
MARION ARENDARSKI

United States Patent Office 3,461,991
Patented Aug. 19, 1969

3,461,991
BIDIRECTIONAL METERING SHOCK ABSORBER
Marion Arendarski, Kalamazoo, Mich., assignor to Pneumo Dynamics Corporation, Cleveland, Ohio, a corporation of Delaware
Original application Oct. 13, 1965, Ser. No. 495,512, now Patent No. 3,367,453, dated Feb. 6, 1968. Divided and this application Sept. 19, 1967, Ser. No. 687,936
Int. Cl. F16d 57/00
U.S. Cl. 188—88
9 Claims

ABSTRACT OF THE DISCLOSURE

This application discloses a bidirectional metering shock absorber of the piston and cylinder type wherein the piston is snubbed or deaccelerated at the end of the stroke and wherein rapid acceleration of the piston is allowed during movement away from the end of the stroke.

---

This is a division of copending application Ser. No. 495,512, filed Oct. 13, 1965, now U.S. Patent 3,367,453.

This invention relates to a fluid shock absorber and more particularly to a fluid shock absorber provided with hydraulic snubbing at each end of the stroke and fast return from the snubbed position.

Under certain conditions, such as in suspension systems for track laying military vehicles, it is desirable to provide shock absorbers incorporating square law damping wherein the damping versus the stroke may be controlled and wherein snubbing may be provided at each end of the stroke of the shock absorber. With the ever increasing desire for better performance of the land-based vehicle to move across rough terrain at higher speeds, it is necessary to provide a suspension system that will insure crew comfort and safety. This may be accomplished by proper suspension springing and proper damping of the system. The damping rate must increase with little or no abrupt changes in the slope of the damping curve to provide appropriate damping and snubbing as the end of the stroke is reached in both the jounce and rebound directions of the shock absorber stroke. Hydraulic snubbing must be incorporated to eliminate the jerk that is transmitted through the bump stops usually incorporated on the hull of the vehicle.

The parameters of the shock absorbers for such a suspension system are preferably such that after snubbing and high damping the shock absorbers may return to neutral with a minimum amount of time elapsed in order to be ready for the ensuing forcing functions derived from the contour of the terrain over which the vehicle is traveling.

It may further be desirable to provide a shock absorber in which the damping rate, and/or the snubbing position may be readily modified, either due to differing load conditions of the vehicle or for purposes of testing the vehicle characteristics at differing snubbing positions or damping rates.

Accordingly, it is an object of this invention to provide a shock absorber having programmed damping versus stroke of the shock absorber.

A further object of this invention is to provide a shock absorber having programmed damping versus stroke of the shock absorber and square law damping versus the piston velocity.

Another object of this invention is to provide a shock absorber having snubbing at both ends of the stroke.

A still further object of this invention is to provide a shock absorber having snubbing at both ends of the stroke which may return to neutral with a minimum amount of damping.

Another and still further object of this invention is to provide a shock absorber operating about a metering rod for providing snubbing at both ends of the stroke of the shock absorber which may return to neutral with a minimum amount of time elapsed.

A yet still further object of this invention is to provide a shock absorber operating about a metering rod providing snubbing at both ends of the stroke of the shock absorber with a complex of check valves and metering lands to control fluid flow during motion in each direction of the shock absorber.

Still another object of this invention is to provide a shock absorber operating about a metering rod providing snubbing at both ends of the stroke of the shock absorber with a complex of check valves and metering lands spaced apart so that the amount of open valve area in the opposite direction from the snubbing or damping is sufficent to allow the shock absorber to return from the snubbed position towards the neutral or static position thereof with a minimum of effort.

Yet another object of this invention is to provide a shock absorber operating about a metering rod having a metering arrangement providing snubbing at both ends of the stroke of the shock absorber with a complex of check valves and a plurality of metering lands, the trailing land having sufficient overlap with the metering arrangement in the metering pin to provide a flow passage through the metering grooves and thereby provide sufficient fluid flow therethrough on the return stroke from the snubbing position to permit the shock absorber to return to the neutral position with a minimum of damping.

Another and further object of this invention is to provide a shock absorber operating about a metering rod having a metering arrangement providing snubbing at both ends of the stroke of the shock absorber with a complex of check valves and a pair of metering lands in the piston thereof to enable the piston to return to the neutral or static position from either snubbed position with a minimum of damping.

Yet another and still further object of this invention is to provide a shock absorber with a metering pin which is readily removable therefrom to permit simple replacement thereof to enable the characteristics of the shock absorber to be readily modified.

Other objects, advantages and important features of this invention will be apparent from a study of the specifications following, taken with the drawing, which together describe, disclose, illustrate, and show certain embodiments, modifications, procedures and alternatives of the invention and what is now considered and believed to be the best method of practicing the principles thereof.

Figure 1A:
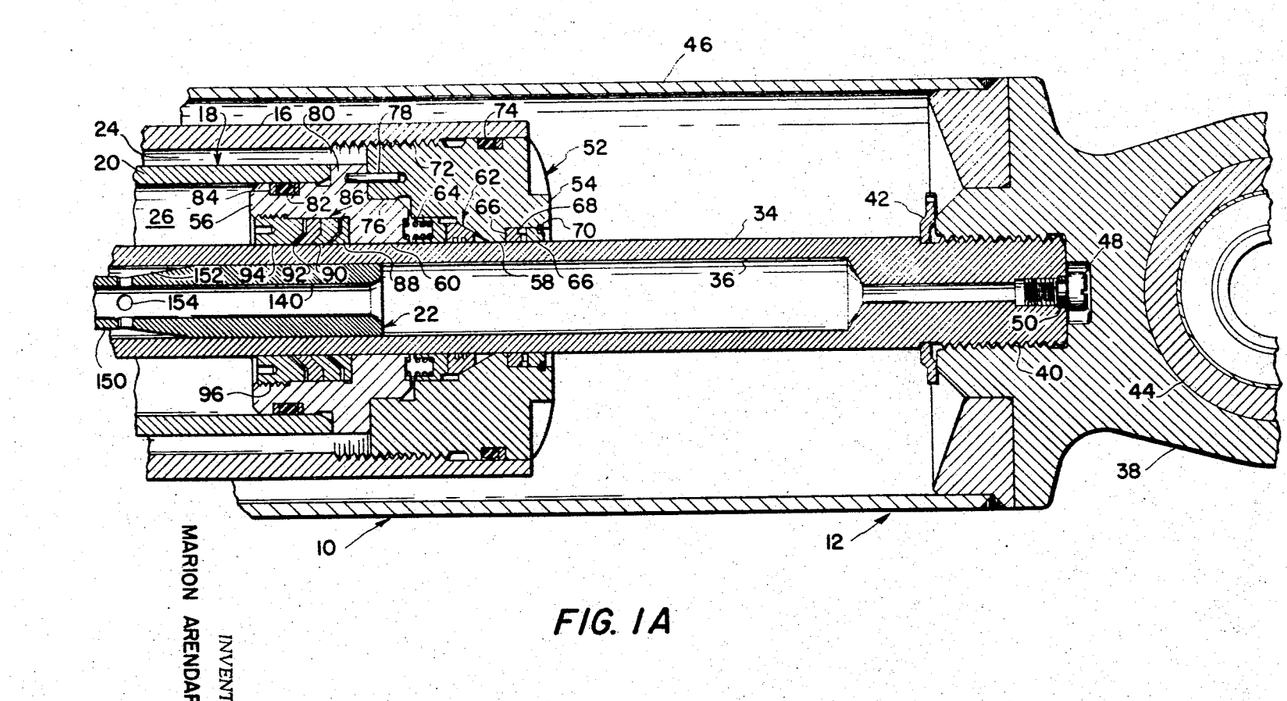
FIGURES 1A and 1B taken together comprise a longitudinal sectional view of a hydraulic shock absorber device constructed according to this invention, and FIGURES 2A and 2B taken together comprise a longitudinal sectional view of an alternative embodiment of a hydraulic shock absorber device constructed according to this invention.
Figure 1B:
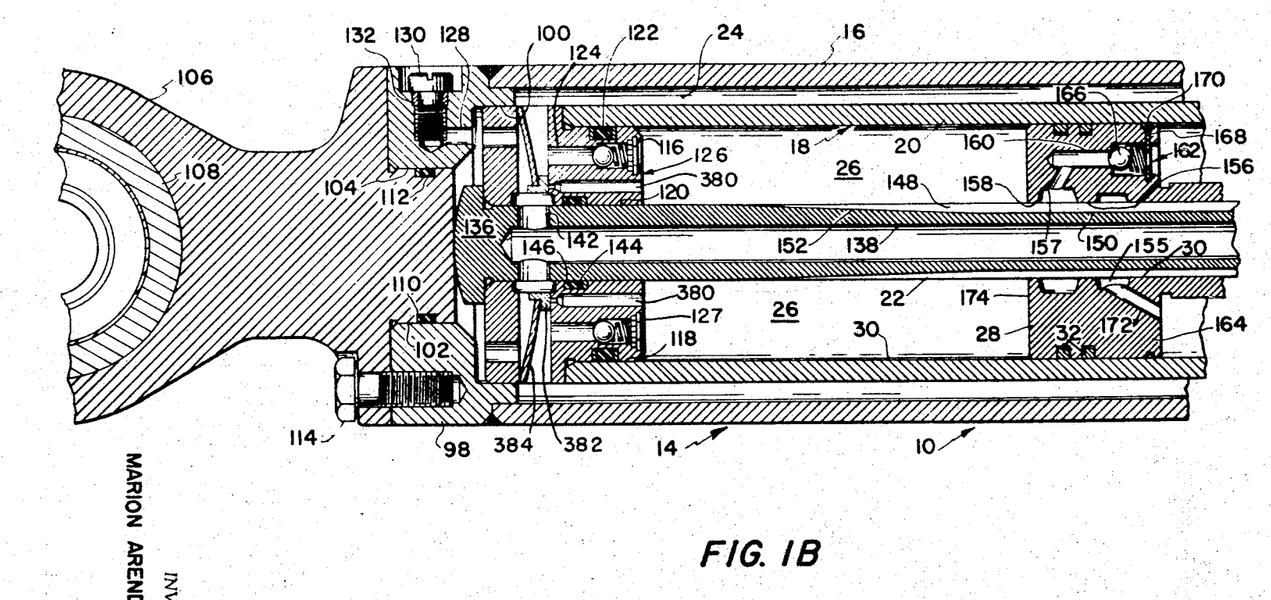

Attention is now directed to FIGURE 1 of the drawing wherein there is shown and illustrated a hydraulic-type shock absorber device 10 having an upper or piston assembly 12 and a lower or cylinder assembly 14. The upper or piston assembly 12 is telescopingly engaged with the lower or cylinder assembly 14 to define the extensible hydraulic-type shock absorber device 10.

The cylinder assembly 14 comprises an outer substantially cylindrical casing assembly 16 and an inner substantially cylinder assembly 18, with the inner cylinder assembly 18 comprising a substantially cylindrical tube 20. The cylinder assembly 14 is also provided with a substantially centrally disposed metering pin 22 extending generally axially therewithin. The outer casing assembly 16 and the inner cylinder assembly 18 are disposed in substantially concentric relationship relative to each other to define an annular chamber or reservoir 24 therebetween. The inner cylinder assembly 18 and the metering pin 22 define therebetween a working chamber 26.

The piston assembly 12 comprises an annular piston member 28 slidably disposed within the inner cylinder assembly 18 and having a bore or surface 30 in surrounding relationship to the metering pin 22. The piston member 28 is therefore slidable within the working chamber 26. The piston member 28 is provided with piston rings 32 on the periphery thereof to sealingly cooperate with the cylinder tube 20 of the inner cylinder assembly 18.

The piston assembly 12 further comprises a piston rod 34 of substantially cylindrical configuration firmly attached to the piston member 28, and provided with an axially extending bore 36 extending into the upper portion thereof to provide clearance for the metering pin 22.

The upper end of the piston rod 34 is provided with a rod end or upper attach fitting 38, secured thereto in any conventional manner, as by a threaded connection 40 and provided with a locking washer 42 to prevent inadvertent dis-assembly thereof. The rod end or upper attach fitting 38 is provided with an eye or plain bearing 44, or the like, to assist in the connection thereof to a vehicle, or the like. A shield assembly or tubular casing member 46 depends from and is securely attached to, as by welding or the like, the periphery of the upper attach fitting 38 to protect the shock absorber 10 from dust, water, stones, or the like.

The upper end portion of the bore 36 of the piston rod 34 is sealingly closed, as by threaded passage plug 48 and an O-ring packing member 50.

The upper or rod end of the lower or cylinder assembly 14 is closed by means of a generally annular cylinder gland assembly 52 comprising an outer gland member 54 and an inner gland member 56. Each of the outer gland member 54 and the inner gland member 56 is provided with a substantially centrally located bore 58 and 60, respectively, to permit passage therethrough of the piston rod 34.

The bore 58 of the outer gland member 54 is provided with a wedge type seal assembly 62, biased into sealing engagement with the outer surface of the piston rod 34 by means of springs 64 compressed between the outer gland member 54 and the inner gland member 56. The bore 58 is also provided with a pair of rod scrapers 66 separated axially therealong by means of a spacer 68 and retained within the bore 58 and in contact with the piston rod 34 by a retaining ring 70.

The peripheral portion of the outer gland member 54 is sealingly secured to the upper end portion of the outer casing assembly 16, as by a threaded connection 72 and is provided with an O-ring packing member 74.

The lower end portion of the bore 58 of the outer gland member 54 is so configured and arranged as to receive and retain therein a boss 76 provided on the upper portion of the inner gland member 56. A dowel pin 78 is provided between the mating surfaces of the outer gland member 54 and the inner gland member 56 to aid in such retention and to provide torsional stability therebetween.

The peripheral portion of the inner gland member 56 is provided with a generally cylindrical shoulder portion 80 which engages the upper end portion of the cylinder tube 20 of the inner cylinder assembly 18 and the outer gland member 54, and which is clamped therebetween by the threaded connection 72 of the juncture of the outer gland member 54 and the outer casing assembly 16. An O-ring packing member 82 and back-up ring 84 seal the juncture between the inner gland member 56 and the cylinder tube 20.

The bore 60 of the inner gland member 56 is provided with a packing assembly 86 to sealingly, slidably engage the outer surface of the piston rod 34. The packing assembly 86 comprises a packing ring 88, a packing seal 90, and a rod seal 92. The packing ring 88, packing seal 90 and rod seal 92 are retained within the bore 60 of the inner gland member 56 by a packing retainer 94 as by threaded connection 96.

A substantially cylindrical outer end cap 98 is secured to the lower end of the outer casing assembly 16 as by welding, or the like. The outer end cap 98 is provided with a generally cylindrical recess 100, the periphery of which is substantially aligned with the outer surface of the cylinder tube 20 of the inner cylinder assembly 18 and a generally axial bore 102 extending from the bottom surface of the recess 100 to the outer surface of the outer end cap 98 for engagement with a generally cylindrical boss 104 provided on a head end or lower attach fitting 106 having an eye or plain bearing 108 therein to facilitate in the attachment thereof.

A recess 110 is provided on the peripheral surface of the boss 104 of the lower attach fitting 106 to receive an O-ring seal member 112 which is sealingly engaged with the bore 102 of the outer end cap 98.

A removable fastening means, such as machine bolt 114 removably secures the lower attach fitting 106 to the outer end cap 98.

An inner cylinder end cap 116 is engaged within the recess 100 of the outer cylinder end cap 98 and projecting therefrom, having a substantially cylindrical boss 118 projecting therefrom on the upper surface portion thereof which is engaged within the confines of the cylinder tube 20 and a substantially centrally located bore 120 extending axially therethrough. The juncture between the periphery of the cylindrical boss 118 and the interior of the cylinder tube 20 is sealed, as by an O-ring type sealing element 122. The inner cylinder end cap 116 is also provided with a plurality of passages 124 providing fluid communication between the working chamber 26 and the reservoir 24. A plurality of check valves 126, held in position by retaining assemblies 127, restrict fluid flow through the passages 124 as will be detailed thereafter.

The outer cylinder end cap 98 is provided with a filling passage 128 in fluid communication with the passage 124 to permit hydraulic fluid to be added to the shock absorber as may be required. A passage plug 130 provided with an O-ring packing member 132 is provided to permit the filling passage 128 to be closed during normal operation of the shock absorber 10.

The metering pin 22, comprising an enlarged head 136 and an elongate stem portion 138 is associated with the inner cylinder end cap 116, as by having the stem portion 138 pass through the central bore 120 of the inner cylinder end cap 116, with the head portion 136 being clamped between the inner cylinder end cap 116 and the lower attach fitting 106. The elongate stem portion 138 of the metering pin 22 is so configured and arranged as to be capable of being received within the bore 36 of the piston rod 34, and thereby pass through and sealingly engage with the bore 30 of the piston member 28.

It should be readily apparent, therefore, that the metering pin 22 may be readily replaced by merely removing the machine bolt 114, which secures the lower attach fitting 106 to the outer cylinder end cap 98, and dis-assembling the lower attach fitting 106 from the outer cylinder end cap 98. With the lower attach fitting 106 disassembled from the outer cylinder end cap 98, the metering pin 22 may be readily removed from the inner cylinder end cap 116.

The metering pin 22 is provided with a substantially centrally disposed axially extending bore 140, terminating within the metering pin 22 at a location therein adjacent to the enlarged head portion 136 thereof. A plurality of transverse passages 142 provides fluid communication between the central bore 140 of the metering pin 22 and the passages 124 of the inner cylinder end cap 116. A fluid seal is provided between the centrally located bore 120 of the inner cylinder end cap 116 by means of an O-ring seal 144 and back-up ring 146.

The exterior surface of the stem portion 138 of the metering pin 22 is provided with a plurality of metering grooves 148 extending longitudinally therealong comprising a uniform depth center section 150 and tapered end portion 152 at each end thereof terminating on the exterior surface of the metering pin 22. The metering grooves 148 allow controlled flow of fluid past the piston member 28, with the center section providing a uniform restriction during the working stroke and the tapered end portions 152 providing the damping at each end of the piston stroke.

A plurality of holes 154, pass transversely through the stem portion 138 of the metering pin 22 providing fluid communication between the metering grooves 148 and the central bore 140.

The bore 30 of the piston member 28 is provided with an upper circular groove 155 and a lower circular groove 157 to define an upper circular land 156 and a lower circular land 158 axially spaced from the upper land 156. A fluid passage 160, provided with a check valve arrangement 162 provides fluid communication between the lower circular groove 157 and the upper surface 164 of the annular piston member 28 within the working chamber 26. The check valve arrangement 162 comprises a ball check element 166 which is retained by means of a lock pin 168 and a retaining ring 170.

The upper circular groove 155 is in fluid communication with the working chamber 26 by means of a passage 172 extending from the upper circular groove 155 to the upper surface 164 of the piston member 28.

To provide for protection against excessive pressures building up within the working chamber 26, such as might occur due to very abrupt compressive shock loads being applied to the shock absorber 10, blow-off passages 380 are provided between the working chamber 26 and the reservoir 24. The blow-off passages 380 are normally closed by means of a valve plate 382 biased into closing engagement therewith by means of a Belleville-type washer 384. When, however, excess pressures are generated within the working chamber 26, this pressure, acting against the valve plate 382 through the passages 380, will move the valve plate 382 through the passages 380 to relieve such excessive pressure from within the working chamber 26. The Belleville-type washer 384 is especially suitable for this purpose, in that it exhibits a snap type action at a present pressure level, keeping the valve plate 382 positively closed at all pressures lower than the preset relief pressure.

The operation of the shock absorber is now believed to be readily apparent. When a tensile load is applied to the shock absorber 10, that is, a force tending to separate the upper attach fitting 38 and the lower attach fitting 106, the piston member 28 will travel within the working chamber 26 towards the inner gland member 56. Hydraulic fluid will be forced from the portion of the working chamber 26 between the piston member 28 and the inner gland member 56 through passage 172 into the upper circular groove 155 of the piston member 28. From the upper circular groove 155 the hydraulic fluid travels along the metering groove 148 past the circular lands 156 and 158 into the portion of the working chamber 26 between the piston member 28 and the inner cylinder end cap 116. Flow of hydraulic fluid through the passage 160 and the lower circular groove 157 is prevented by the check valve arrangement 162 present in the passage 160. Additional fluid necessary to compensate for the swept piston rod volume will be drawn from the reservoir 24 through the passages 124 and past the check valves 126. Some fluid may also flow from passages 124 in the inner cylinder end cap 116, through transverse passages 142, central bore 140, and transverse holes 154 of the metering pin 22 into the metering groove 148 and thereby into the working chamber 26.

As the upper circular land 156 in the movement thereof along the stem portion 138 of the metering pin 22 encounters the tapered portion 152 of the metering groove 148 at the upper end of the metering pin 22, fluid flow therethrough will be progressively chocked due to the tapering of the metering groove 148 until the upper land 156 engages the outer surface of the stem portion 138 of the metering pin 22. At this position, the shock absorber 10 will become hydrostatically locked against further extension thereof since the hydraulic fluid trapped between the piston member 28 and the inner gland member 56 cannot flow around the piston member 28.

Flow through the passage 160 is prevented by the check valve arrangement 162 and fluid flow through the passage 172 is prevented by the metering pin 22.

If a compression load is now applied to the shock absorber 10, while it is in this fully extended position, it should be readily apparent that the snubbing action of the tapered portion 152 of metering groove 148 will be rendered ineffective. Movement of the piston member 28 towards the lower end of the shock absorber 10 is permitted by means of fluid flow through the metering groove 148, under the lower circular land 158, into the lower circular groove 157 and passage 160. In this direction of fluid flow, the check valve arrangement 162 permits free passage of hydraulic fluid through the passage 160. As further compression loading is applied to the shock absorber 10, the piston member 28 continues to move towards the inner cylinder end cap 116, with the hydraulic fluid passing through the metering grooves 148, under both the upper and lower circular lands 156 and 158 and through the passages 160 and 172. The movement of the piston member 28 towards the inner cylinder end cap 116 is controlled by the cross-sectional area of the metering groove 148, and therefore the movement of the piston member 28 is properly damped. The excess hydraulic fluid in the working chamber 26 due to the swept piston rod volume is shunted to the reservoir 24 through the transverse holes 154, central bore 140, transverse passages 142 and passages 124. As the lower surface 174 of the piston member 28 engages the lower tapered portion 152 of the metering grooves 148, the cross-sectional area of the metering grooves 148 decreases and the movement of the piston member 28 is progressively snubbed until the progressive tapering of the tapered portion 152 effectively precludes fluid flow through the piston member 28 at which position the shock absorber 10 becomes hydrostatically locked against further compressive movement. It is apparent that the check valves 126 in the inner cylinder end cap 116 effectively precludes hydraulic fluid from passing outwardly from the lower portion of the working chamber 26 through passages 124.

When the shock absorber 10 is in the fully compressed configuration, that is, when the piston member 28 is adjacent the inner cylinder end cap 116, if a tensile load is then applied to the shock absorber 10, the upper circular groove 155 and passage 172 permits a damped fluid flow from the upper portion of the working chamber 26 through the transverse holes 154, the bore 140, and the transverse passages 142 of the metering pin 22 into the passages 124 of the inner cylinder end cap 116 and thereby into the reservoir 24 and back to the lower portion of the working chamber 26 through the check valves 126.

The shock absorber 10, therefore, permits a damped movement of the piston member 28 in either direction of piston travel, corresponding to tension and compression load of the shock absorber 10 during the central portion of the piston stroke. The degree of damping during this central portion in either direction of travel is controlled by the cross-sectional area of the metering grooves 148. As the piston member 28 approaches either end of the stroke, the tapered portions 152 of the metering grooves 148 progressively increase the degree of damping until the piston member 28 is hydrostatically locked against further travel. In this manner, the shock absorber 10 is provided with hydraulic snubbing at each end of the shock absorber stroke. The upper and lower circular grooves 155 and 157, however, enable a rapid return of the piston member 28 from the snubbed position.

If different characteristics, that is, a different length stroke, a different degree of damping, or a different degree of snubbing action are desired, the shock absorber 10 is designed whereby the metering pin 22 may be readily replaced to provide such differing characteristics.

To replace the metering pin 22, all that is necessary is to remove the machine bolt 114, separate the lower attach fitting 106 from the outer cylinder end cap 98, and slide the metering pin 22 outwardly through the axial bore 102 of the outer cylinder end cap 98. A different metering pin having such different characteristics may be then readily inserted through the bore 102 of the outer cylinder end cap 98 and into operative position. Attaching the lower attach fitting 106 to the outer cylinder end cap 98 and clamping it in position by means of the machine bolt 114 would then complete the reassembly and effectively retain the metering pin 22 in operative position.

The filling passage 128 and the passage plug 130 permit ready draining and/or refilling of the hydraulic fluid in the shock absorber 10 as may be desired.

The combination of the inner gland member 56 and the outer gland member 54, each carrying a packing or sealing assembly 86 and 62, respectively, provide an especially effective sealing arrangement between the cylinder assembly 14 and the piston rod 34 of the piston assembly 12.

Figure 2A:
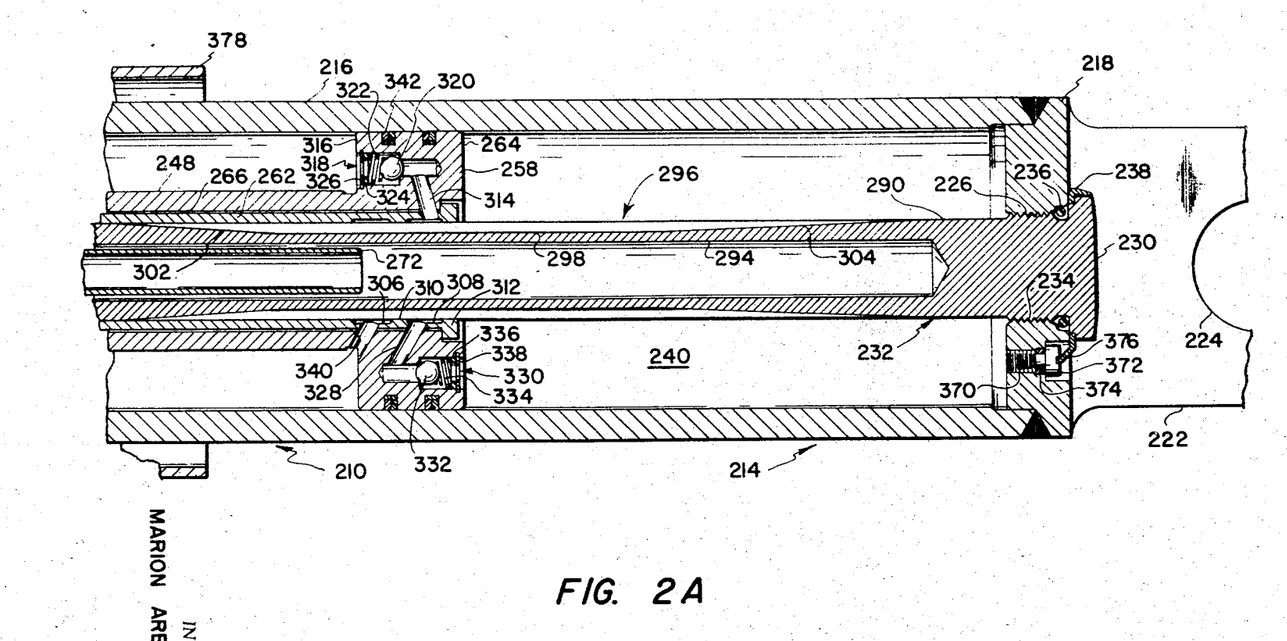
Figure 2B:
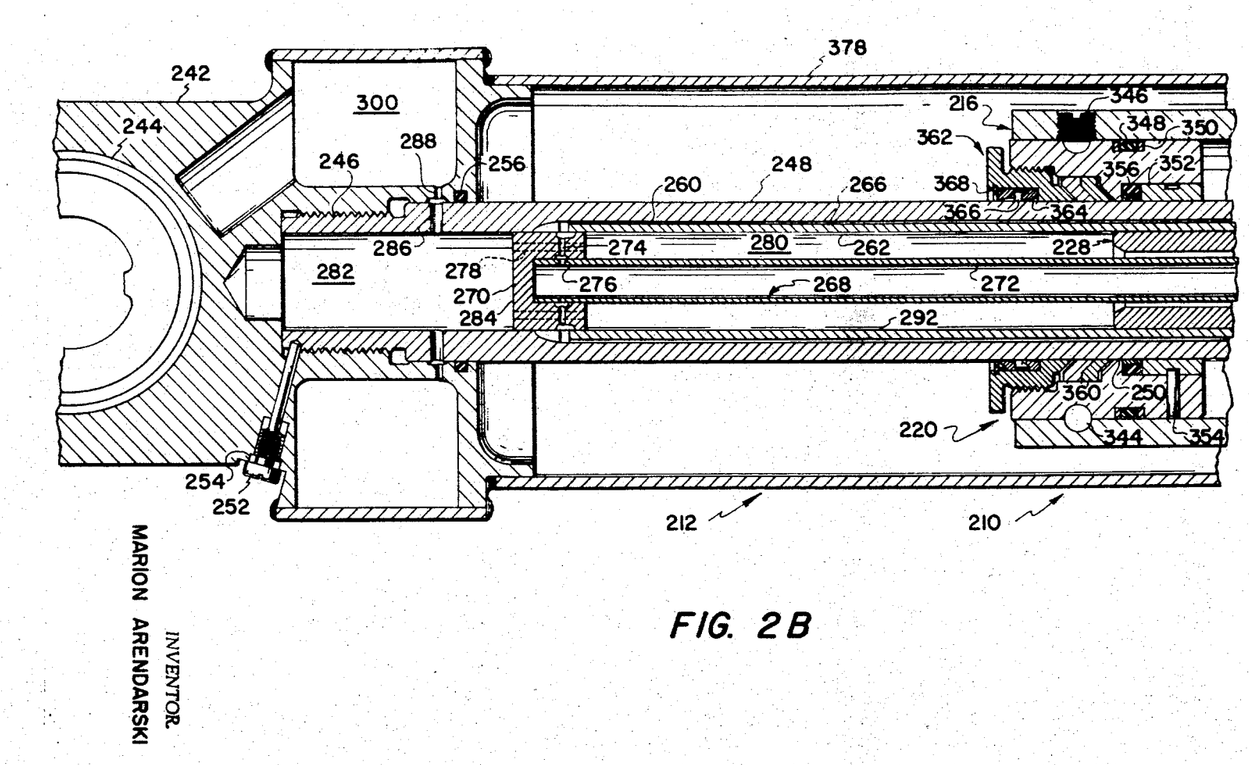

Referring now to FIGURE 2 of the drawing wherein there is shown and illustrated an alternate embodiment of a hydraulic shock absorber device 210 having an upper or piston assembly 212 and a lower or cylinder assembly 214. The upper or piston assembly 212 is telescopingly engaged with the lower or cylinder assembly 214 to define the extensible hydraulic type shock absorber device 210.

The cylinder assembly 214 comprises an outer substantially cylindrical casing assembly 216, a cylinder end cap 218 closing the lower end thereof, and a gland assembly 220 closing the upper end thereof. A head end or lower attach fitting 222 is formed integrally with the cylinder end cap 218 and is provided with an eye or bearing 224 to facilitate attachment thereof to a vehicle, or the like.

The cylinder end cap 218 is also provided with a substantially centrally located threaded bore 226. A metering pin 228 comprising an enlarged head portion 230 and an elongate stem portion 232, the stem portion 232 being provided with external screw threads 234 at a location therealong adjacent the enlarged head portion 230 for engagement with the threaded bore 226 of the cylinder end cap 218. The enlarged head portion 230 of the metering pin 228 is so constituted and arranged as to be engagable by a wrench, or the like, to enable the screw threads 234 to be firmly engaged within the threaded bore 226. A packing seal 236 is provided at the juncture of the metering pin 228 and the cylinder end cap 218 to provide a fluid tight connection therebetween and a tab washer 238 is provided for preventing inadvertent unscrewing of the metering pin 228 from the cylinder end cap 218.

The metering pin 228 is therefore positioned substantially centrally and axially of the casing assembly 216 and defines an annular working chamber 240 therebetween.

The upper or piston assembly 212 comprises a rod end or upper attach fitting 242 provided with an eye or bearing 244 to facilitate attachment thereof to a vehicle, or the like. The upper attach fitting 242 is also provided with an accumulator chamber 300 and a substantially centrally located threaded bore 246.

A substantially cylindrical piston rod 248 is threadedly engaged with the threaded bore 246 of the upper attach fitting 242, through a bore 250 extending substantially centrally through the gland assembly 220 and into the working chamber 240.

The piston rod 248 is secured within the threaded bore 246 by means of a locking plug 252 which is provided with a packing seal 254 to prevent hydraulic fluid leakage past the locking plug 252. A packing seal 256 is also provided at the juncture of the piston 248 and the upper attach fitting 242 to prevent hydraulic fluid leakage at this location.

Integrally associated with the lower end of the piston rod 248 is substantially annular piston member 258 slidable within the working chamber 240. The piston member 258 and the piston rod 248 are provided with a central bore 260. A metering sleeve 262 is positioned within the central bore 260 and extends from the lower surface 264 of the piston member 258 axially inwardly into the central bore 260 to a location therealong adjacent the upper attach fitting 242. A leak passage 266 is provided between the metering sleeve 262 and the central bore 260.

A tube assembly 268 comprising a mounting block 270 and a hollow tube 272 is mounted within the central bore 260. The mounting block 270 and hollow tube 272 are provided with transverse passages 274 and 276, respectively in fluid communication with one another to provide fluid communication between the leak passage 266 and the interior of the hollow tube 272. The mounting block 270 is also provided with a plurality of longitudinal passages 278 passing therethrough to provide fluid communication between a chamber 280 and the hollow tube 272 and the leak passage 266 and a chamber 282 defined by the central bore 260 and the upper surface 284 of the mounting block 270.

A plurality of transverse passages 286 and 288 are provided in the piston rod 248 and upper attach fitting 242, respectively, to provide fluid communication between the accumulator chamber 300 and the chamber 282.

The outer peripheral surface 290 of the elongate stem portion 232 of the metering pin 228 is so configured and arranged as to be sealingly received within the interior surface 292 of the metering sleeve 262. The stem portion 232 of the metering pin 228 is also provided with a bore 294 to permit the hollow tube 272 of the tube assembly 268 to be telescopingly received therewithin.

The outer peripheral surface 290 of the metering pin 228 is provided with a plurality of metering grooves 296, each comprising a substantially equi-depth central portion 298 and upper and lower tapered portions 302 and 304, respectively, extending from the central portion 298 and terminating on the outer peripheral surface 290.

The lower end portion of the interior surface 292 of the metering sleeve 262 is provided with an upper circular groove 306 and lower circular groove 308. The upper and lower grooves 306 and 308 are axially spaced to define an upper metering land 310 therebetween and the lower groove 308 is axially spaced from the lower end of the metering sleeve 262 to define a lower metering land 312.

A passage 314, extends through the metering sleeve 262 and piston member 258 to a location on the upper surface 316 of the piston member 258 to provide fluid communication between the lower groove 308 and the working chamber 240 between the piston member 258 and the gland assembly 220. The passage 314 is provided with a check valve assembly 318 which comprises a ball check element 320 which is biased to a closed position by means of a spring 322 which is retained in position by means of a washer 324 and a retaining ring 326. The check valve assembly 318 permits fluid flow from the lower groove 308 through the metering sleeve 262 and piston member 258 and into the working chamber 240 the piston member 258 and the gland assembly 220 while precluding fluid flow reversely therethrough.

A passage 328 intersects the groove 308 at a point further away from the end of the sleeve 262 than the intersection of the passage 314 with the groove 308. The passage 328 provides fluid communication through the metering sleeve 262 and the piston member 258 to a location on the lower surface 264 of the piston member 258 and into the working chamber 240 between the piston member 258 and the cylinder end cap 218. The passage 328 is provided with a check valve assembly 330 which comprises a ball check element 332 biased to a closed position by means of a spring 334 which is held in position by means of a washer 336 and a retaining ring 338.

The check valve assembly 330 and the passage 328, therefore, allows hydraulic fluid flow from the lower groove 308 through the metering sleeve 262 and the piston member 258 into the working chamber 240 between the piston member 258 and the cylinder end cap 218 while precluding fluid flow reversely therethrough.

The upper groove 306 is maintained in fluid communication with the working chamber 240 between the piston member 258 and the gland assembly 220 by means of a passage 340.

A plurality of piston rings 342 on the periphery of the piston member 258 provide hydraulic sealing between the periphery of the piston member 258 and the casing assembly 216 and thereby precludes fluid flow thereabout.

The gland assembly 220 is precluded from longitudinal movement along the casing assembly by means of a plurality of balls 344 which engage both the gland assembly 220 and the casing assembly 216. The balls are retained in position by a ball retainer 346. A hydraulic seal is provided between the periphery of the gland assembly 220 and the interior surface of the casing assembly 216 by means of a packing seal 348 and back-up ring 350.

A sliding connection between the bore 250 of the gland assembly 220 and the outer peripheral surface of the piston rod 248 is provided by a bushing 352 which is retained in position by means of a dowel pin 354. A seal is provided by means of a packing seal 356 and a cap strip 358. A further seal is provided by means of a rod seal packing assembly 360 which is held in position by means of a rod seal retainer 362 which carries a plurality of rod scraper elements 364 spaced apart by means of spacer rings 366. The rod spacers 364 are held in position by means of a retainer ring 368.

A threaded bore 370 is provided in the cylinder end cap 218 to provide a filling passage to enable the working chamber 240 of the shock absorber 210 to be filled with hydraulic fluid. A hydraulic passage seal 372 and a packing seal 374 are utilized to close the threaded bore 370 during operation of the shock absorber 210. The hydraulic passage seal 372 is precluded from inadvertent removal by means of a locking tab 376 of the tab washer 238.

A shield assembly 378 is provided which is affixed to the upper attach fitting to protect the shock absorber 210.

The operation of the shock absorber 210 shown and illustrated in FIGURE 2 is now believed to be readily apparent.

With the interior of the shock absorber 210 being filled with a hydraulic fluid, if a tensile load is applied to the shock absorber 210, that is, a force tending to separate the upper attach fitting 242 from the lower attach fitting 222, the hydraulic fluid present in the working chamber 240 between the piston member 258 and the gland assembly 220 will be placed in compression. The fluid will therefore be forced through the passage 340 and the upper groove 306 of the piston member 258 and into the metering grooves 296 of the metering pin 228. The effective cross-sectional area of the metering grooves 296 will be controlled by the depth of the metering grooves 296 and the metering lands 310 and 312. The hydraulic fluid will therefore travel past the piston member 258 along the metering grooves 296 and into the working chamber 240 below the piston member 258, that is, between the piston member 258 and the cylinder end cap 218. The hydraulic fluid present in the chamber 280, as this chamber decreases in size, will be forced through the longitudinal passages 278 and transverse passages 286 and 288 into the accumulator chamber 300. The additional fluid required to enter the working chamber 240, due to the swept piston rod volume is admitted to the working chamber 240 from the reservoir by means of a flow path comprising transverse passages 286 and 288, longitudinal passages 278, the chamber 280, the bore 294 of the metering pin 228, the hollow tube 272 of the tube assembly 268, the transverse passages 274 and 276, and the leak passage 266.

As the upper metering land 310 encounters the upper tapered portions 302 of the metering grooves 296, it is readily apparent that the fluid flow therethrough is progressively chocked, until the metering land 310 encounters the outer peripheral surface 290 of the metering pin 228 at the location whereat the upper tapered portion 302 of the metering grooves 296 terminates thereon, whereat further fluid flow through passage 340 and outwardly from the upper portion of the working chamber 240 will be effectively precluded. At this position, the shock absorber 210 will become hydrostatically locked against further tensile movement.

If a compression loading is then applied to the shock absorber 210 while in this position, the hydraulic fluid will be enabled to pass from the lower portion of the working chamber 240 through the metering grooves 296, past the lower metering land 312 and into the lower groove 308. From the lower groove 308, the fluid will pass into the upper portion of the working chamber 240 through passage 314 and past the check valve assembly 318. The additional fluid present in the working chamber 240, due to the swept piston rod volume will be shunted back to the accumulator chamber 300 through the leak passage 266.

It is apparent that the spacing between the lower groove 308 and the upper groove 306 enables the shock absorber 210 to return from the snubbed position rapidly, that is under the design damping condition.

As the compression loading increases, the lower metering land 312 will encounter the lower tapered portions 304 of the metering grooves 296 whereby fluid flow therepast will become progressively decreased until such time as the lower metering land 312 encounters the outer peripheral surface 290 of the metering pin 228 at the termination therein of the lower tapered portions 304 of the metering grooves 296. At this position, the shock absorber 210 will become hydrostatically locked, or snubbed, against further compression movement. When in this position, if a tensile load is then applied to the shock absorber 210, it is apparent that a flow path is opened between the upper and lower portions of the working chamber 240 through the passage 340, upper groove 306, past the upper metering land 310, into the lower groove 308, and through the passage 328 past the check valve assembly 330. It is therefore apparent that the shock absorber 210 is enabled to rapidly return, that is, under the design damping condition from the fully compressed, snubbed position.

The shock absorber 210 is therefore enabled to provide a controlled damping against movement in either compression or tension during a central portion of the stroke thereof and to provide hydraulic snubbing action at each end of the stroke while permitting a rapid return from either snubbed position towards the central position.

It is also believed readily apparent that the damping provided in tension and compression may be separately controlled by means of the selected configuration of the metering lands 310 and 312, respectively.

As the metering pin 228 is threadedly engaged with the cylinder end cap 218 in such a manner as to be readily accessible from the exterior of the shock absorber 210, it is apparent that the metering pin 228 may be readily replaced to provide simple, rapid changes in the characteristics of the shock absorber 210, such as, and by way of example only, a different damping rate, a different rate, or differing snubbing positions. It is also apparent that the metering sleeve 262 may be readily replaced by loosening the locking plug 252 and unthreading the upper attach fitting 242 from the piston rod 248. With the upper attach fitting 242 and attached shield 378 removed, the ball retainer 346 may be readily removed and the balls 344 emptied to permit dis-assembly of the cylinder assembly 214. Once the cylinder assembly 214 has been disassembled, the metering sleeve 262 may be slid out of the bore 260 and readily replaced to provide for a different configuration or spacing of the upper and lower circular grooves 306 and 308 and/or the upper and lower metering lands 310 and 312.

The design of the shock absorber of this invention is therefore such as to enable simple, rapid dis-assembly thereof.

From the above description and disclosure it should be appreciated that there is herein described, disclosed, illustrated and shown, various embodiments or modifications of a novel system, method, arrangement, or apparatus for a hydraulic type shock absorber which provides a controlled damping in either direction of stroke coupled with rapid hydraulic snubbing at each end of such stroke and which provides for a rapid return of the shock absorber from such snubbed position.

It should also be appreciated that there is herein described, disclosed, illustrated and shown, various embodiments or modifications which enable a rapid modification of such shock absorber characteristics by means of a readily replaceable metering arrangement.

While the invention has been described, disclosed, illustrated and shown in terms of certain preferred embodiments or modification which it has assumed in practice, the scope of the invention should not be deemed to be limited by the precise certain embodiments or modifications herein shown, described, illustrated and disclosed, such other modifications or embodiments as may be apparent to those having the benefit of the teachings herein, being intended to be reserved.

Having described the invention, what is claimed is:

1. A hydraulic shock absorber of the direc acting type, comprising, in combination:
   a substantially cylindrical outer casing assembly comprising a substantially cylindrical outer tube member, an annular outer gland member structurally associated with one end portion of said tube member, and an outer end cap structurally associated with the other end portion of said tube member;
   a substantially inner casing assembly comprising a substantially cylindrical tube member, and annular inner gland member structurally associated with one end portion of said inner tube member and said outer annular gland member, and an inner end cap structurally associated with the other end portion of said inner tube member and with the interior of said outer end cap,
   said inner cylinder assembly being concentrically mounted within said outer cylinder assembly to define therebetween an annular reservoir;
   a substantially cylindrical elongate metering pin structurally associated with said inner end cap and projecting therefrom axially within said inner cylinder assembly to define therebetween a working chamber;
   a piston assembly comprising an annular piston member slidable within said working chamber and in sealing engagement with said inner tube member and said metering pin and an elongate piston rod structurally associated with said piston member and slidably extending through said inner and outer gland members,
   said metering pin being provided with a plurality of longitudinally extending metering grooves having tapered portions at each end thereof terminating on the outer peripheral surface of said metering pin;
   said piston member being provided with a first circular groove extending circumferentially around the central hole thereof at a location therein spaced from the face of said piston member adjacent said inner end cap and a second circular groove extending circumferentially around the central hole thereof at a location therein spaced a greater distance from the face of said piston member adjacent said inner end cap than said first circular groove;
   first fluid conveying means in said piston member providing fluid communication between said first circular groove and the face of said piston member adjacent said inner gland member;
   second fluid conveying means in said piston member providing fluid communication between said second circular groove and the face of said piston member adjacent said inner gland member;
   check valve means in said first fluid conveying means for permitting fluid flow from said first circular groove to said face of said piston member and preventing fluid flow reversely therethrough; and
   means for providing fluid communication between said reservoir and said working chamber.

2. The hydraulic shock absorber as defined in claim 1, wherein:
   said inner end cap is provided with a substantially central bore extending therethrough, and
   said metering pin is engaged within said bore of said inner end cap to enable said metering pin to be removed therefrom without removing said inner end cap.

3. In combination with a shock absorber of the hydraulic type having a cylinder assembly and a reciprocable bored piston assembly dividing the cylinder assembly into first and second operating chambers,
   a metering device for permitting a controlled flow of hydraulic fluid within the cylinder assembly past the piston upon movement of the piston within the cylinder, the metering device comprising
   a configured metering pin having a metering portion for permitting such controlled flow past the piston and a tapered portion associated with the first operating chamber for decreasing such flow to hydraulically snub the piston when the piston engages the tapered portion; and
   means for rendering the tapered portion ineffective during piston movement enlarging the first chamber to enable the piston to be rapidly moved away from the snubbed position, the means comprising
   first and second fluid bypass means associated with the piston providing fluid communication between first and second axially spaced locations along the piston bore to a surface on the piston in communication with the first chamber; and
   check valve means in the first fluid bypass for preventing fluid flow therethrough from the first chamber to the second chamber when the piston moves to decrease the size of the first chamber and allow fluid flow therethrough when the piston moves to enlarge the first chamber.

4. The combination of claim 3 wherein the second fluid bypass is unvalved.

5. The combination of claim 3 wherein the first axial location is more remote from the cylinder end associated with the first chamber than the second axial location.

6. The combination of claim 3 wherein the metering pin comprises a groove providing the metering portion.

7. The combination of claim 3 wherein the first and second fluid bypass means comprise passageways leading from intermediate the piston to the piston surface.

8. The combination of claim 3 wherein the piston assembly comprises a piston rod extending from the piston surface, the piston rod having a central bore therethrough receiving the metering pin; and a metering pin comprises a passageway extending therethrough and aperture means providing communication between the passageway and the metering portion at a location within the piston rod bore.

9. The combination of claim 3 further comprising means for accumulating hydraulic fluid; and means for shunting hydraulic fluid to the accumulating means when the shock absorber is compressed.

References Cited

UNITED STATES PATENTS

| | | | |
|---|---|---|---|
| 461,347 | 10/1891 | Krone. | |
| 462,970 | 11/1891 | Krone | 188—96 X |
| 2,171,827 | 9/1939 | Elliott | 188—88 |
| 3,216,535 | 11/1965 | Schultze | 188—88 |

GEORGE E. A. HALVOSA, Primary Examiner

U.S. Cl. X.R.

188—100

UNITED STATES PATENT OFFICE
CERTIFICATE OF CORRECTION

Patent No. 3,461,991                          August 19, 1969

Marion Arendarski

It is certified that error appears in the above identified patent and that said Letters Patent are hereby corrected as shown below:

Column 2, line 51, "specifications" should read -- specification --. Column 4, lines 48 and 49, "thereafter" should read -- hereafter --. Column 5, line 58, "present" should read -- preset --. Column 11, line 50, "direc acting" should read -- direct acting --.

Signed and sealed this 1st day of September 1970.

(SEAL)
Attest:

Edward M. Fletcher, Jr.                   WILLIAM E. SCHUYLER, JR.
Attesting Officer                            Commissioner of Patents